United States Patent Office 3,009,288
Patented Nov. 21, 1961

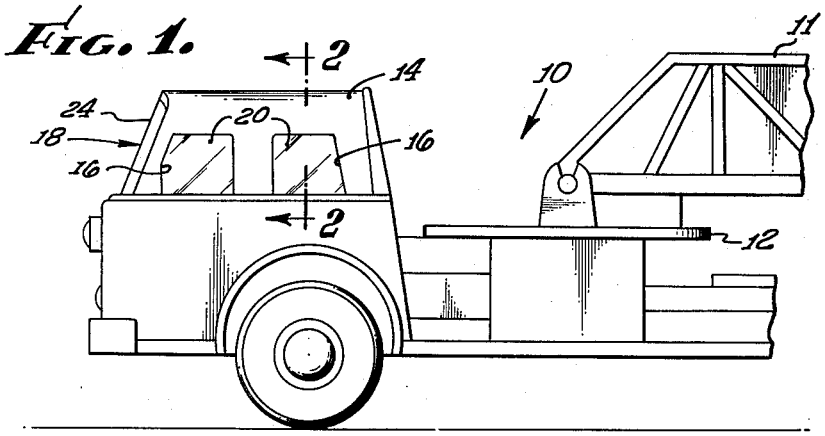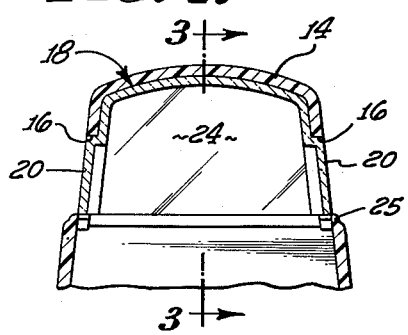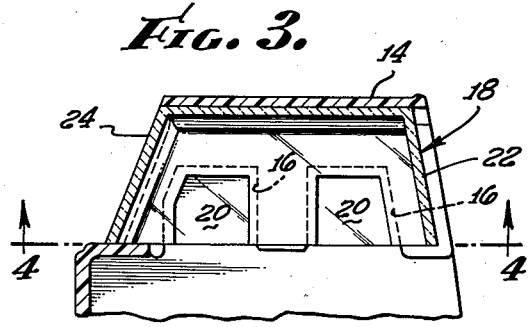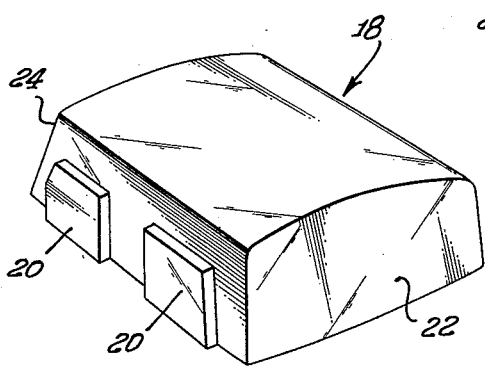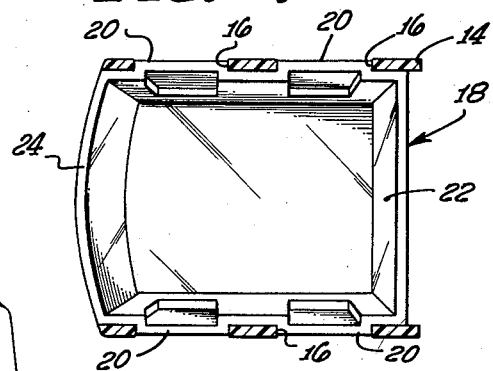

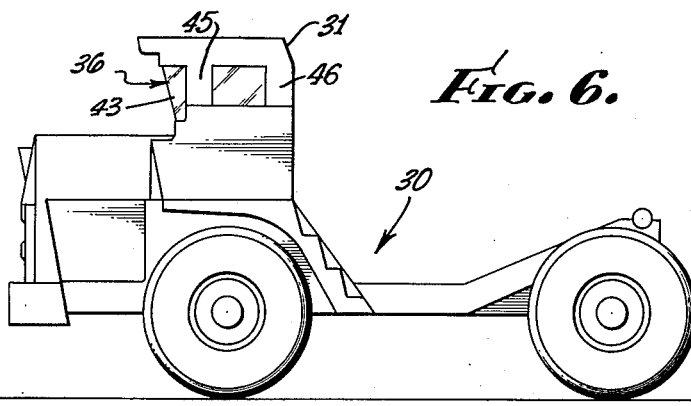
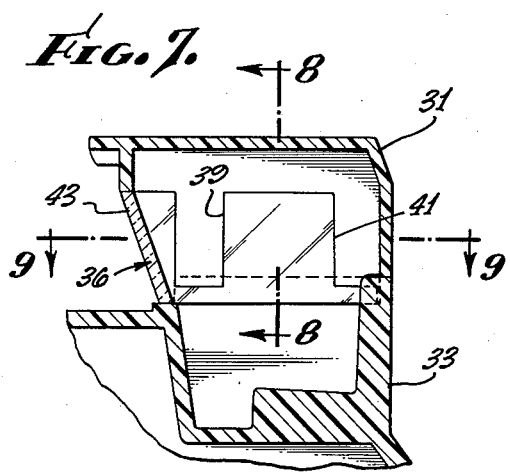
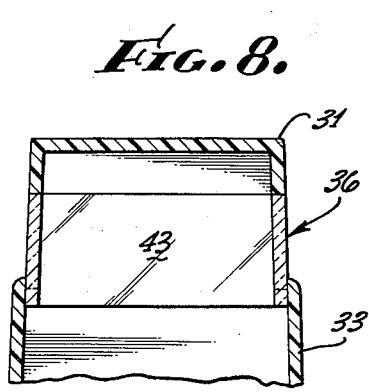
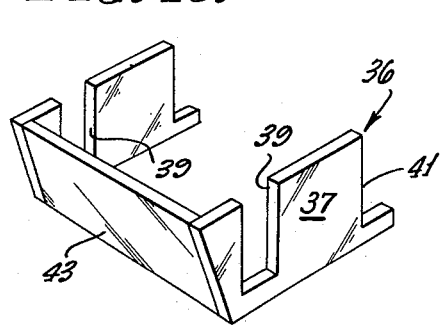
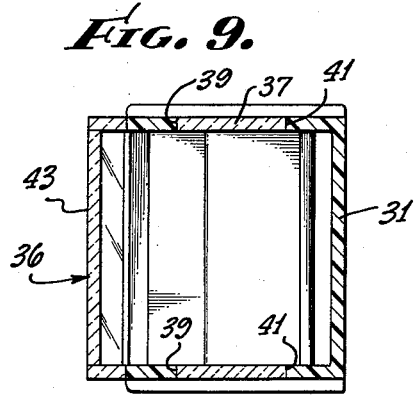

3,009,288
TOY VEHICLE WINDOW CONSTRUCTION
Reuben B. Klamer, Pacific Palisades, Calif., assignor to Link Research Corporation
Filed Oct. 26, 1959, Ser. No. 848,772
3 Claims. (Cl. 46—223)

This invention relates to improvements in the construction and fabrication of toys. More particularly, it relates to improvements in the construction or fabrication of enclosures, such as for example, the cab of toy vehicles, in such a way that the enclosure is completed and assembled in a simplified and convenient way so as to have transparent window panes or panels and also a transparent windshield.

The invention provides a novel construction and technique of construction and/or fabrication whereby an enclosure as described such as a vehicle cab may be fabricated and assembled simply from two molded or preformed parts, one of which is a transparent body or form fitting contiguously within the other such that when assembled, the two parts form the completed enclosure, that is the cab, having transparent panes or panels in the window openings of the cab and having a transparent windshield.

The invention is particularly adapted, as described, in the construction of vehicle cabs for example; however, it is not limited thereto but may be adapted in the construction of other types of articles, particularly in the field of toys.

In the light of the foregoing, the primary object of the invention is to provide improved and simplified ways and means of fabricating toy articles of the type forming enclosures having transparent windows or window panes therein and by way of example in vehicle cabs, a transparent windshield.

A further more specific object of the invention is to provide an improved construction particularly adaptable in toys wherein a part or component of the toy providing an enclosure is formed from a molded or shaped frame or part and a second transparent molded or shaped frame or part which fits contiguously into the first part having portions fitting into window openings in the first part so that the two assembled parts form the completed component which may constitute an enclosure or partial enclosure having transparent windows therein.

Another object is to provide a construction as in the foregoing wherein the two parts have mutually interfitting portions configurated to hold the two parts together when assembled.

Another object is to provide a construction and/or construction technique as in the foregoing wherein the transparent shaped part or form has embossments thereon or offsets forming the window panes which fit into the window openings in the enclosure, such as a vehicle cab, in a manner to hold the two parts together.

Further objects and numerous additional advantages of the invention will become apparent from the following detailed description and annexed drawings, wherein:

FIG. 1 is a side view of a toy embodying the herein invention;

FIG. 2 is a sectional view taken along the line 2—2 of FIG. 1;

FIG. 3 is a sectional view taken along the line 3—3 of FIG. 2;

FIG. 4 is a view taken along the line 4—4 of FIG. 3;

FIG. 5 is a perspective view of the transparent shaped or formed part of the assembly;

FIG. 6 is a side view of a toy embodying another form of the invention;

FIG. 7 is a sectional view through the cab of the toy of FIG. 6;

FIG. 8 is a sectional view taken along the line 8—8 of FIG. 7;

FIG. 9 is a sectional view taken along the line 9—9 of FIG. 7; and

FIG. 10 is a perspective view of the transparent part of the assembly.

Referring now more particularly to FIGS. 1 to 5 of the drawings, numeral 10 designates generally a toy in the form of a piece of fire equipment which is a truck having an extensible ladder 11 pivotally mounted on a turntable 12 on the truck.

The toy of FIG. 1 illustrates an exemplary modification of the invention which is not limited to this particular usage.

In FIG. 1, the body of the truck may be made of molded or formed plastic by way of example and this plastic body may be mounted on and suitably attached to a cast metal chassis by way of example. The cab 14 may be a separate component demountable from the other parts of the toy or it may be permanently attached thereto. In the form of the invention shown, the cab 14 has window openings as shown at 16 and this plastic component itself is open at the front and rear.

The invention provides a construction and a construction or fabrication technique whereby the enclosure, that is the cab 14, may be assembled into a completed part or component simply by the insertion or fitting of another transparent part into the interior thereof.

Referring to FIG. 5, this figure shows in perspective a transparent formed or molded part 18 which may be of plastic, for example. The part 18 is formed or molded to have a configuration to fit contiguously into the interior of the part 14 constituting the cab enclosure. As shown in the figures, this part has an arcuate or domed roof and a slanting front adapted to receive the windshield panel. The part 18 may be made relatively thin and fits contiguously on the inside of the cab 14 against the inside of the top and the insides of the side walls of the cab 14.

The part 18 has embossments or offset portions 20 as shown which have the shape and configuration of the window openings 16 in the cab 14. The part 18 has a back portion or panel 22 and a front portion or panel 24. When the part 18 is assembled or fitted into the cab 14, the back panel or pane 22 forms the back window of the truck cab 14. The front panel or pane 24 forms the windshield of the truck and preferably has an arcuate or curved configuration as shown in FIG. 4.

As may be seen from the foregoing, the transparent part 18 may be simply slipped into the cab 14 endwise and fitted therein with the window panels 20 in place in the window openings 16. The two parts are held in position together in this manner. The transparent front and back portions of the part 18 complete the enclosure, that is the cab. The cab part 14 may be a component or portion detachably fitting onto the lower body portion of the truck as indicated at 25 in FIG. 2. In either event, the matter of assembling the two parts is extremely simple and convenient and produces a completed enclosed component which is very realistic in appearance particularly in that the cab has actual transparent window panes having the further advantage of being unbreakable.

FIG. 6 of the drawings shows a slightly modified form of the invention adapted in a toy truck as shown at 30. The truck has a cab as shown at 31, the upper part of which is a formed or molded component preferably of plastic forming a partial enclosure. The part 31 has a front opening adapted to receive a windshield as shown. The part 31 may be a separate formed part adapted to be demountably attached to the lower body portion 33. In the construction as shown in FIG. 6, however, the body portion of the truck is of a formed plastic unitary or integral construction mounted on a cast metal chassis.

The cab enclosure 31 is completed by way of a transparent formed or molded plastic insert or part 36. The part 36 is in the form of a transparent more or less skeleton frame. It has side portions as shown at 37 which form the window panes or panels for the truck cab. These panels are part of side portions of the unit 36 having slots therein as shown at 39 and cut away parts 41. The front of the part 36 forms a slanting windshield for the truck cab as indicated at 43.

The portions of the sides of the truck cab 31 at the sides of the window openings as indicated at 45 and 46 in effect form ribs which fit into the slots 39 and the cut-aways 41 respectively of the part 36 when it is in position with the panels 37 fitting into or within the window openings thereby holding the parts in assembled relationship. The front part, that is the windshield 43, fits into the front opening of the cab to complete the enclosure and form the windshield for the cab.

In the construction shown, the part 36 is readily insertable through the front of the cab, fitting contiguously therewithin and held in the manner described by the window panes or panels 37 fitting into the window openings. As may be observed, therefore, the construction is similar to that of the previous modification wherein an enclosure is completed and assembled by the fitting together of two contiguous parts. The transparent windows are provided by way of the one interfitting part being completely transparent and having pane portions which form the windows in the completed enclosure.

From the foregoing, those skilled in the art will observe and appreciate that the construction and technique of the invention provides a convenient, simplified and inexpensive way and means of constructing and fabricating enclosures having windows therein and is particularly adapted in the toy art as applied to vehicle cabs and the like. The invention is, however, not limited to any particular line of toys but may be applied and adapted in various ways as may be recognized by those skilled in the art.

The foregoing disclosure is representative of preferred forms of the invention and is to be interpreted in an illustrative rather than a limiting sense, the invention to be accorded the full scope of the claims appended hereto.

What is claimed is:

1. An enclosure construction for toys comprising, a hollow enclosure having at least one open side and window openings in opposed side walls thereof, a thin resilient transparent shell element of a size to be inserted through said open side, and having window formations thereon filling said window openings in said opposed side walls and serving thereby to lock said shell in said enclosure against removal through said open side and constituting transparent panes for said window openings.

2. An enclosure construction as defined in claim 1 wherein said shell includes a wall portion spanning and filling said open side and defining a large window therein.

3. An enclosure construction as defined in claim 1 wherein said shell is snugly nested against the inner surfaces of said enclosure and wherein said window formations comprise outwardly embossed areas projecting outwardly into said window openings and being substantially flush with the outer surface of said enclosure.

References Cited in the file of this patent

UNITED STATES PATENTS

| 2,726,482 | Roehrl | Dec. 13, 1955 |
| 2,916,851 | Groschen | Dec. 15, 1959 |

FOREIGN PATENTS

| 820,567 | Germany | Nov. 12, 1951 |
| 1,138,964 | France | Feb. 4, 1957 |
| 1,162,296 | France | Apr. 8, 1958 |